United States Patent

Langan

[11] Patent Number: 6,129,965
[45] Date of Patent: Oct. 10, 2000

[54] CUT SHEET LINERLESS LABELS

[75] Inventor: Joseph W. Langan, Cheektowaga, N.Y.

[73] Assignee: Moore Business Forms, Inc., Grand Island, N.Y.

[21] Appl. No.: 08/078,918

[22] Filed: Jun. 21, 1993

Related U.S. Application Data

[63] Continuation-in-part of application No. 07/912,851, Jul. 13, 1992, Pat. No. 5,354,588.

[51] Int. Cl.[7] ........................ A61F 13/02
[52] U.S. Cl. .............. 428/41.8; 428/41.3; 428/41.4; 428/42.2; 428/42.3; 428/202; 428/352; 428/354; 428/447; 428/914
[58] Field of Search ............. 428/40, 202, 352, 428/354, 447, 914, 40.1, 41.3, 41.4, 41.8, 42.2, 42.3

[56] References Cited

U.S. PATENT DOCUMENTS

| | | | |
|---|---|---|---|
| H509 | 8/1988 | Chao | 526/264 |
| 2,549,419 | 4/1951 | Callahan | 40/615 |
| 3,896,249 | 7/1975 | Keeling et al. | 428/202 |
| 4,851,383 | 7/1989 | Fickenscher et al. | 503/200 |
| 5,064,717 | 11/1991 | Suzuki et al. | 428/352 |
| 5,154,974 | 10/1992 | Norman et al. | 428/355 |
| 5,284,690 | 2/1994 | Williams et al. | 428/40 |

OTHER PUBLICATIONS

Encyclopedia of Chemical Technology, vol. 16, John Wiley & Sons, New York, 1981, pp. 785–792.
Material Safety Data Sheet, General Electric Co., Product UV9300, Feb. 1991.

*Primary Examiner*—Christopher Raimund
*Attorney, Agent, or Firm*—Nixon & Vanderhye P.C.

[57] ABSTRACT

A stack of cut sheet linerless labels is provided. Each label substrate (e.g., paper) having first and second faces, with pressure sensitive adhesive (e.g., repositional adhesive) substantially completely covering the first face, and a release coat (e.g., silicone) substantially completely covering the second face. Adhesive and release coat are selected so that the adhesive force between them is 0.001–1.2 ounces per inch pursuant to a standard test. The labels are disposed in the stack with the pressure sensitive adhesive of each label engaging the release coat of the label below it. A tie coat may be provided between the adhesive and the substrate to enhance adherence between them, and a thermosensitive layer may be provided on the substrate second face beneath the release coat. An adhesive uncoated strip may be provided adjacent an edge of each label to facilitate removal from a stack.

18 Claims, 2 Drawing Sheets

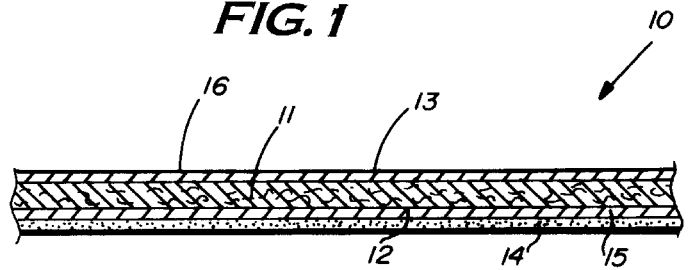
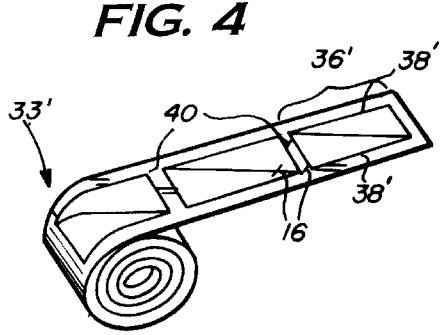
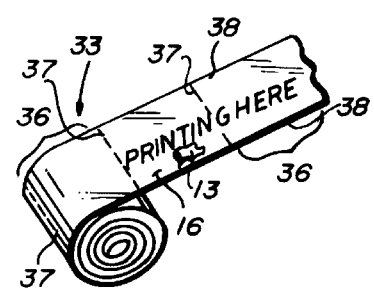
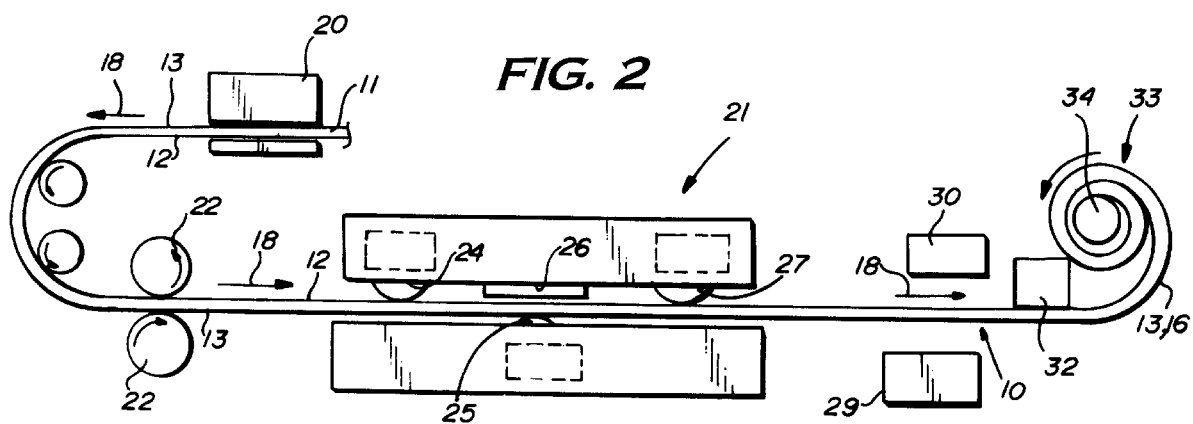

CUT SHEET LINERLESS LABELS

CROSS REFERENCE TO RELATED APPLICATION

This application is a continuation-in-part of application Ser. No. 07/912,851, filed Jul. 13, 1992, now U.S. Pat. No. 5,354,588.

BACKGROUND AND SUMMARY OF THE INVENTION

Linerless labels, such as shown in U.S. Pat. Nos. 3,051,588, 3,285,771, and 4,851,383, and in Canadian patent 1,248,412, are known to have advantages over conventional pressure sensitive labels which are mounted on a liner which has been coated with a release coating. In the conventional labels the liner acts as a support for transport, printing and storage, and after the label is removed from the liner it must be disposed of. A linerless label, on the other hand has the face coated with a release coating, and the back with a pressure sensitive adhesive (PSA), and is wound in a roll configuration so that the PSA is in contact with the release coating, and the release coating faces outwardly. The linerless construction offers advantages and lower costs due to substantial material reduction, elimination of disposal concerns and costs associated with release coated liners, and in providing approximately twice as many labels per roll.

While linerless labels have numerous advantages, they have not had widespread commercial acceptance, perhaps due in part to impediments to easy and clean peeling off of the PSA from the release coating in the roll format. If the adhesion of the PSA to the substrate is not strong enough (and this adhesion can degrade over time under some environmental conditions and materials), adhesive may stick to the release coating, or the substrate may be torn.

Further, there are some situations in which a roll of linerless labels is not desired. Normally, a customer needs a label dispensing machine to effectively remove labels from a roll, and the roll is either perforated at each label for separation, or a sharp peel label cutoff mechanism is necessary. In order to avoid these difficulties, according to the present invention linerless labels are provided in cut sheet format, all of the edges of the label being clean cut. Thus, a dispensing apparatus is not necessary and the product can be used with automatic applicators, storage and shipping costs are reduced, and the user of the labels can distribute various quantities to each manufacturing site.

When the linerless labels are in cut sheet form, it is important they be constructed so that robotic arms, or other automatic equipment, can easily peel one label from another. That is, minimal peel resistance must be provided, only enough to hold the labels in a stack; that is, the release coat and pressure sensitive adhesive associated with the label must be such that the force required to separate them is 0.001–1.2 ounces per inch when utilizing a standard test. Also, various different types of label, with particular coatings, can be provided utilizing this aspect of the invention.

According to the present invention, a stack of cut sheet linerless labels is provided comprising the following elements: A plurality of linerless labels, each label comprising a substrate having first and second faces, a pressure sensitive adhesive substantially completely covering the first face, and a release coat substantially completely covering the second face. The pressure sensitive adhesive and release coat having an adhesive force between them of 0.001–1.2 oz/inch (e.g. about 0.4 oz/inch), when peeling a one inch by six inch sample at a rate of twelve inches per minute at a ninety degree angle, while being sufficiently tacky to hold the labels together in a stack. The labels are disposed in a stack with the pressure sensitive adhesive of each label engaging the release coat of the next label below it.

One way to achieve the minimal adhesive force that is desired according to the invention is to provide a silicone release coat and repositional adhesive as the pressure sensitive adhesive. Typical repositional adhesives that may be utilized are Cleantac® adhesives sold by Moore Business Forms, Inc., of Lake Forest, Ill., or repositional adhesive provided on NOTESTIX® pads and business forms sold by Moore, or provided on the Post It® product sold by 3M. Alternatively permanent pressure sensitive adhesives, UV curable adhesives, and hot melt adhesives may be utilized as long as, in combination with a release coating, they meet the peel force limitation of 0.001–1.2 oz/inch.

A tie coat may be provided to enhance adherence of the pressure sensitive adhesive to the substrate, the tie coat adhering to both the substrate first face and the pressure sensitive adhesive. Alternatively, or in addition, a thermosensitive layer may be provided on the substrate second face beneath the release coat, such as shown in copending application Ser. No. 07/914,116, filed Jul. 15, 1992 (atty. ref. 263-778, 92-20) now U.S. Pat. No. 5,292,713. The labels may be constructed so that they are mailing label size (e.g., about 3 inches×5 inches), and printed indicia may be provided on the substrate second face beneath the release coat or on top of it. Also, a non-adhesive tab—to facilitate removal—may be provided.

The invention also contemplates a method of making a stack of cut sheet linerless labels utilizing a coating machine, and a substrate having first and second faces. The method comprises the following steps: (a) Continuously moving the substrate in a first direction through the coating machine; and substantially sequentially. (b With the coating machine, applying in a predetermined sequence to the moving substrate a pressure sensitive adhesive to the substrate first face, and a release coating to the substrate second face. (c) Cutting the substrate to form individual cut sheet labels, disconnected from previous and following labels. And (d) stacking the individual cut sheet labels into a stack with the pressure sensitive adhesive of each label engaging the release coat of an underlying label.

Step (b) may be practiced to apply the release and pressure sensitive coats (e.g., silicone release coat and repositional adhesive) so that the force required to separate them is 0.001–1.2 oz/inch (e.g. about 0.4 ounces per inch) when peeling a 1 inch×6 inch sample at a rate of 12 inches per minute at a 90° degree angle (a standard test). Step (b) may also be practiced to apply a tie coat to the substrate first face, the pressure sensitive adhesive being applied to the tie coat; and to apply a thermosensitive layer to the substrate second face, the release coat being applied to the thermosensitive layer.

It is the primary object of the present invention to provide an advantageous linerless label stock, and a simple yet effective method for making the stock. This and other objects of the invention will become clear from an inspection of the detailed description of the invention and from the appended claims.

BRIEF DESCRIPTION OF THE DRAWINGS

FIG. 1 is a cross-sectional view of exemplary linerless label stock showing each of the layers (with greatly exaggerated thickness);

FIG. 2 is a side schematic view showing exemplary apparatus for practicing an exemplary method of producing roll from linerless labels;

FIGS. 3 and 4 are perspective views of exemplary rolls of linerless label stock of FIG. 1, produced utilizing the apparatus in FIG. 2;

DETAILED DESCRIPTION OF THE DRAWINGS

Figure 5:
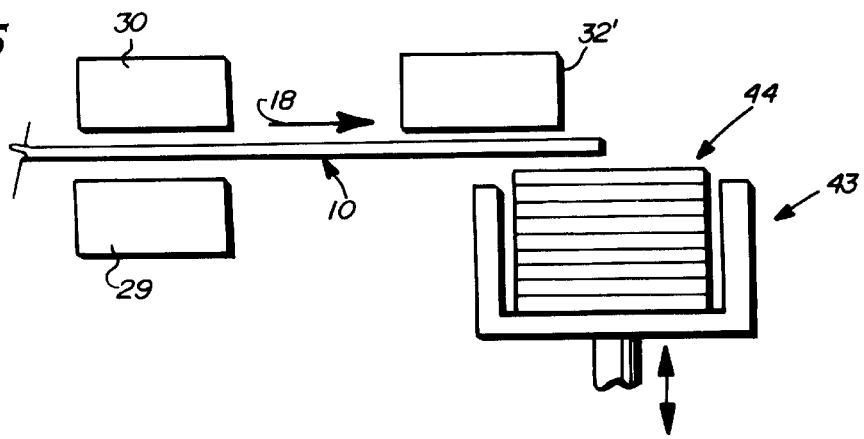
FIG. 5 is a side schematic showing exemplary apparatus for producing cut sheet linerless labels, modifying the apparatus of FIG. 2, according to the invention.

An exemplary section of linerless label stock is shown generally by reference numeral 10 in FIG. 1. The stock 10 comprises a substrate 11 having a first face 12 and a second face 13. The substrate may be any conventional substrate used in label applications, such as bond paper, latex-impregnated paper, vinyl, or polyester. The substrate is typically not a thermally sensitive one.

Associated with the substrate 11 is a coating of pressure sensitive adhesive 14. The PSA may comprise any conventional formulation used in pressure sensitive adhesive applications, including solvent-base, water-base, hot melt or radiation curable formulations. Typical adhesive formulations are listed in the "Handbook of Pressure-Sensitive Technology" by Donatas Satas, Van Nostrand Reinhold Company, 1983. Particularly desirable PSA comprises a water-based acrylic adhesive prepared by free radical polymerization of acrylic monomers (either a homopolymer or a copolymer). For example the polymer may be made 70–100% of a soft monomer such as 2-ethylhexyl acrylate, 0–6% of functional monomer such as acrylic acid, and 0 to 30% of a hard monomer such a vinyl acetate. However, for best results in making cut sheet linerless labels (e.g., FIGS. 4–6), repositional adhesive may be utilized.

Adherence of the PSA 14 to the substrate 11 first face 12 may be enhanced by a tie coating 15. The tie coating 15 adheres to both the PSA and the substrate 11. It may comprise, or consist essentially of, a dispersion of a pigment, preferably silica, with a binder material, such as polyvinyl alcohol (PVA). For example the tie coating may comprise or consist essentially of about 30–40 parts silica dispersion, about 20–35 parts PVA, and 30–40 parts water.

On the second face 13 of the substrate 11, which may have printing thereon (see FIGS. 3 and 5), a release coat 16 is provided. The release coating 16 is of any suitable material that imparts a lower surface energy to the face 13, and has properties with respect to the PSA 14 so that it will release easily from the PSA 14; that is the PSA 14 will not stick to the release coating 16, while it has great affinity for the tie coating 15. Typical release coatings are listed in chapters 17 and 18 of the Handbook of Pressure-Sensitive Adhesive Technology by Satas, referenced above. Preferred formulations include silicone resins (e.g., GE UV9300) and chrome complexes of fatty acids.

FIG. 2 illustrates exemplary apparatus for producing a roll of linerless labels. The substrate 11 is continuously moved in the direction of arrows 18. Printing may be applied to the second face 13, as with the conventional printer 20, which may be located prior to a coating machine 21, and drives for the substrate 11 may be any conventional driving means, such as drive rollers 22.

In the single, conventional coating machine 21, all three of the coatings 14–16 are provided. For example a first roller or like applicator 24 applies the tie coating 15 to the first face 12, while shortly thereafter a second roller or applicator 25 applies the release coating 16 to the second face 13. A dryer 26, for effecting drying of the tie coating 15 much more quickly than by ambient air (e.g. a hot air dryer) so that the tie coat is dry by the time it reaches the third roller or other applicator 27, which applies the pressure sensitive adhesive 14 over the tie coat 15, on the face 12, is also provided. The preferred location of the printer 20 is after the dryer 26 but before the second applicator 27.

Drying of the PSA 14 and/or the release coat 16 may be provided by dryers 29, 30 downstream of the coating machine 21 in the direction of arrows 18, and after drying by the dryers 29, 30 (which effect drying much quicker than ambient air, and may be hot air, infrared, or like conventional dryers depending upon the particular coatings); and after the stock 10 is dried, it is cut into labels by a conventional cutter 32. Then the stock is taken up in roll format 33 by take up mechanism 34, with the release coating 16 and second face 13 on the outside of the roll 33 that is being taken up, with the PSA 14 in contact with the release coating 16 in the spiral configuration of the roll 33.

Printing can also be performed (not shown) on the release coat 16 (e.g. a hot melt ink, ink jet printer).

The labels can be formed from a web which, just prior to take up 34, is slit into the rolls 33, or the rolls 33 can be formed later, after take up.

FIGS. 3 and 4 illustrate two different constructions of rolls of linerless label. The roll 33 of FIG. 3 has individual labels 36 thereof which have been cut, with less than complete severing (e.g. by very fine perforations, or die cuts, indicated by cut lines 37 in FIG. 3), generally transverse to the direction of elongation of the substrate 11 of the roll 33, with the sides 38 of each label corresponding to the sides of the substrate 11. Each label 36 has a width and length typically less than one foot. In this construction there is no waste whatsoever but rather each label 36 is merely detached along a line 37 from the next quadrate label 36 in sequence.

FIG. 4 illustrates a modified form of a roll 33' of linerless labels according to the invention. In this embodiment, the cutter 32 effects complete die cutting of individual labels 36' out of the substrate, so that the edges 38' thereof do not correspond to the side edges of the substrate. The labels 36' may have any shape (they need not be quadrate), but in this embodiment there is some waste material provided by the skeletal structure 40 of the substrate outside of the labels 36'.

One specific example of a linerless label producible in roll form according to the invention is as follows:

EXAMPLE

A tie coat 15 was prepared according to the following formulation:

36 parts—20% Cab-O-Sperse II dispersion, Cabot Corp.
28 parts—10% Polyvinyl Alcohol, Air Products & Chemicals (Partially Hydrolyzed)
36 parts—Water PSA 14 was prepared according to the following formulation:

51.2 parts—2% PVA 523, Air Products & Chemicals
48.7 parts—2-ethylhexyl acrylate (monomer) BASF 0.002 parts—Benzoyl Peroxide (BPO), Lucidol division of Pennwalt A release coating 16 was prepared according to the following formulation:

15 parts—Quilon C, Valcon 85 parts—Water

The tie coat 15 was applied to first face 12 with the applicator 24, the release coat 16 was applied to face 13 with the applicator 25, the tie coat was dried by the dryer 26, the PSA was applied over the tie coat 15 with the applicator 27, and the entire stock 10 was dried by dryers 29, 30, and after cutting into labels 32 was self-wound in roll form 33 by winder 34.

FIG. 5 illustrates a modification of the apparatus of FIG. 2 to produce cut sheet linerless labels. The rest of the apparatus to the left of the dryers 29, 30 in FIG. 5 is substantially the same as for FIG. 2. The conventional cutting mechanism 32', however, rather than merely putting perforations 37 between the labels as illustrated in FIG. 3, completely severs one label from the next to produce cut sheet labels, which fall into the conventional stacking device 43. A stack of cut sheet linerless labels 44 is illustrated both in FIGS. 5 and 6.

Figure 6:
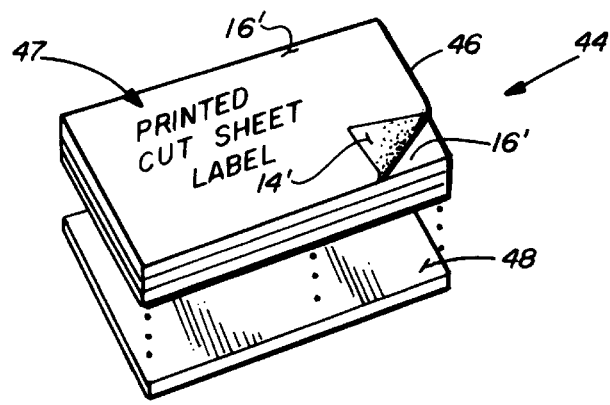
FIG. 6 is a top perspective view of a stack of cut sheet linerless labels according to the present invention.

In FIG. 6, the stack 44 includes individual labels 46 each of which has pressure sensitive adhesive coating 14' substantially completely covering the "bottom face" thereof, and the release coat 16' substantially completely covering the top face thereof. Printed indicia 47 may be provided on the release coat 16', or on the substrate of the label 46 beneath the release coat 16'.

For the stack of cut sheet linerless labels 44 it is very important that there be a minimum of adhesive force between the adhesive 14' and the release coat 16' in order to allow separation of the labels 46 in the stack 44 by robotic arms or like automated equipment. In fact, it is desirable that the adherence between the adhesive 14' and the release coat 16' be between 0.001–1.2 ounces per inch (e.g. about 0.4 oz/inch), pursuant to a standard test. The standard test measures the separation force when peeling a 1 inch×6 inch samples at a rate of 12 inches per minute at a ninety degree (90°) angle. The sample is prepared by attaching a label strip to an aluminum panel, release side up, affixing the adhesive side of another 1 inch×6 inch strip of the material to the surface of the first strip by rolling four times with a four pound rubber roller at the rate of 12 inches per minute, and allowing the sample to wet-out for 20 minutes.

While a number of different adhesives and release coats 14', 16' may be utilized to achieve the desired 0.001–1.2 ounces per inch peeling force, one particular set of materials that will achieve that result (e.g. about 0.4 oz/inch) are a repositional adhesive 14' and a silicone release coat 16. The repositional adhesive 14' may be a conventional type such as sold by Moore Business Forms, Inc., of Lake Forest, Ill., under the trademark Cleantac® (e.g. see U.S. Reg. Number H509, incorporated by reference herein) or utilized on the Moore repositional paper sheets, in pads, sold under the trademark NOTESTIX®, or the repositional adhesive in the 3M commercial sold under the trademark Post It®. A typical silicone release material for coating 16' is available from GE Silicones of Waterford, N.Y., under the tradename "GE UV9300", an epoxy-functional silicone. Depending upon the release coat 16' properties other adhesives can also achieve the desired peel force, including permanent PSA, UV curable adhesive, and hot melt adhesives.

In the cut sheet embodiment of FIGS. 5 through 8, while a tie coat between the pressure sensitive adhesive 14' and the substrate of label 46 is preferred, it is not essential and the pressure sensitive adhesive 14' may be applied directly to the first face of the substrate. Also, different varieties of label constructions can be provided in the cut sheet form, as illustrated schematically in FIG. 8. A bottom release sheet 48 is optionally provided at the bottom of the stack 44.

Figure 7:
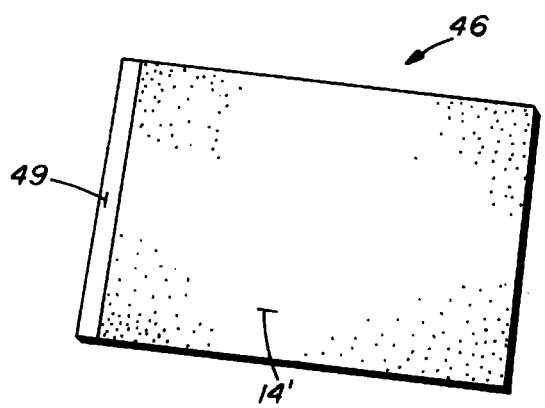
FIG. 7 is a bottom plan view of one of the labels of FIG. 6.

In order to facilitate removal of the labels 46 from the stack 44, part of the label back adjacent an edge may be uncoated, as illustrated at 49 for the label 46 back as seen in FIG. 7. The uncoated portion 49 provides a tab facilitating grasping by a robotic arm, human finger, or the like.

Figure 8:
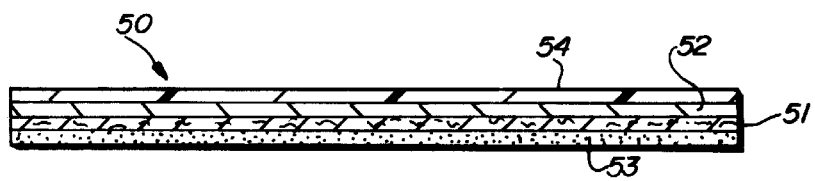
FIG. 8 is a cross-sectional view of another embodiment of exemplary cut sheet linerless label according to the invention.

FIG. 8 illustrates a cut sheet label 50 with the various layers thereof greatly exaggerated for clarity of illustration. This label includes a conventional substrate 51 of paper or the like, with a thermosensitive layer 52 (such as described in copending application Ser. No. 07/914,116, filed Jul. 15, 1992) thereon. A pressure sensitive adhesive layer 53 is on the bottom of the substrate 51 opposite the thermosensitive layer 52, and a release coat 54 may be applied on the thermosensitive layer 52, either directly thereon or on top of a barrier coat. An example of a suitable release coat is one containing as the primary operative ingredient chromium pentanhydroxy (tetradecanoato) di-.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stack of cut sheet linerless labels comprising:

a plurality of linerless labels, each label comprising a substrate having first and second faces, a pressure sensitive adhesive substantially completely covering said first face, and a release coat substantially completely covering said second face;

said pressure sensitive adhesive and release coat having an adhesive force between them of between 0.001–1.2 oz/inch, when peeling a one inch by six inch sample at a rate of twelve inches per minute at a ninety degree angle, while being sufficiently tacky to hold the labels together in a stack; and said labels disposed in a stack with the pressure sensitive adhesive of each label engaging the release coat of the next label below it.

2. A stack of cut sheet linerless labels as recited in claim 1 wherein said release coat is a silicone release coat, and said adhesive is repositional adhesive.

3. A stack of cut sheet linerless labels as recited in claim 1 further comprising a portion of said first face of each label, adjacent an edge, uncoated with adhesive, to facilitate removal of said labels from the stack.

4. A stack of cut sheet linerless labels as recited in claim 1 further comprising printed indicia on said substrate second face.

5. A stack of cut sheet linerless labels as recited in claim 1 wherein said labels have the approximate size of 3 inches×5 inches.

6. A stack of cut sheet linerless labels including:

a plurality of linerless labels, each label comprising a substrate having first and second faces, a pressure sensitive adhesive substantially completely covering said first face, and a release coat substantially completely covering said second face;

said pressure sensitive adhesive comprising repositional adhesive, and said release coat comprising a silicone release coat; and said labels disposed in a stack with the pressure sensitive adhesive of each label engaging the release coat of the next label below it.

7. A stack of cut sheet linerless labels as recited in claim 6 further comprising printed indicia on said substrate second face.

8. A stack of cut sheet linerless labels as recited in claim 6 further comprising a portion of said first face of each label, adjacent an edge, uncoated with adhesive, to facilitate removal of said labels from the stack.

9. A stack of cut sheet linerless labels comprising:
   a plurality of linerless labels, each label comprising a substrate having first and second faces;
   a tie coat substantially completely covering and adhering to said substrate face;
   a pressure sensitive adhesive substantially completely covering said tie coat and adhered thereto;
   a release coat substantially completely covering said second face;
   said pressure sensitive adhesive and release coat having an adhesive force between them of between 0.001–1.2 oz/inch, when peeling a one inch by six inch sample at a rate of twelve inches per minute at a ninety degree angle, while being sufficiently tacky to hold the labels together in a stack; and
   said labels disposed in a stack with the pressure sensitive adhesive of each label engaging the release coat of the next label below it.

10. A stack of cut sheet linerless labels as recited in claim 9 wherein said tie coat comprises a dispersion of silica with polyvinyl alcohol.

11. A stack of cut sheet linerless labels comprising:
   a plurality of linerless labels, each label comprising a substrate having first and second faces; a pressure sensitive adhesive substantially completely covering said first face; a thermosensitive layer on said substrate second face substantially completely covering said second face; and a release coat substantially completely covering said thermosensitive layer on said second face;
   said pressure sensitive adhesive and release coat having an adhesive force between them of between 0.001–1.2 oz/inch, when peeling a one inch by six inch sample at a rate of twelve inches per minute at a ninety degree angle, while being sufficiently tacky to hold the labels together in a stack; and
   said labels disposed in a stack with the pressure sensitive adhesive of each label engaging the release coat of the next label below it.

12. A stack of cut sheet linerless labels as recited in claim 11 wherein said release coat is disposed directly on said thermosensitive layer.

13. A stack of cut sheet linerness labels comprising:
   a plurality of linerless labels, each label comprising a substrate having first and second faces; a tie coat substantially completely covering and adhering to said substrate first face; a pressure sensitive adhesive substantially completely covering said tie coat and adhered thereto; a thermosenstive layer on said substrate second face substantially completely covering said second face; a release coat substantially completely covering said thermosenstive layer on said second face;
   said pressure sensitive adhesive and release coat having an adhesive force between them of between 0.001–1.2 oz/inch, when peeling a one inch by six inch sample at a rate of twelve inches per minute at a ninety degree angle, while being sufficiently tacky to hold the labels together in a stack; and
   said labels disposed in a stack with the pressure sensitive adhesive of each label engaging the release coat of the next label below it.

14. A stack of cut sheet linerless labels as recited in claim 13 wherein said tie coat comprises a dispersion of silica with polyvinyl alcohol.

15. A stack of cut sheet linerless labels as recited in claim 14 wherein said release coat is disposed directly on said thermosensitive layer.

16. A stack of cut sheet linerless labels including:
   a plurality of linerless labels, each label comprising a substrate having first and second faces; a tie coat substantially completely covering and adhering to said substrate first face; a pressure sensitive adhesive substantially completely covering said tie coat and adhered thereto; a release coat substantially completely covering said second face;
   said pressure sensitive adhesive comprising repositional adhesive, and said release coat comprising a silicone release coat; and
   said labels disposed in a stack with the pressure sensitive adhesive of each label engaging the release coat of the next label below it.

17. A stack of cut sheet linerless labels including:
   a plurality of linerless labels, each label comprising a substrate having first and second faces; a pressure sensitive adhesive substantially completely covering said first face; a thermosensitive layer on said substrate second face substantially completely covering said second face; and a release coat substantially completely covering said thermosensitive layer on said second face;
   said pressure sensitive adhesive comprising repositional adhesive, and said release coat comprising a silicone release coat; and
   said labels disposed in a stack with the pressure sensitive adhesive of each label engaging the release coat of the next label below it.

18. A stack of cut sheet linerless labels including:
   a plurality of linerless labels, each label comprising a substrate having first and second faces; a tie coat substantially completely covering and adhering to said substrate first face; a pressure sensitive adhesive substantially completely covering said tie coat and adhered thereto; a thermosensitive layer on said substrate second face substantially completely covering said second face; and a release coat substantially completely covering said thermoplastic layer on said second face;
   said pressure sensitive adhesive comprising repositional adhesive, and said release coat comprising a silicone release coat; and
   said labels disposed in a stack with the pressure sensitive adhesive of each label engaging the release coat of the next label below it.

* * * * *